United States Patent
Inatome et al.

[11] Patent Number: 6,028,657
[45] Date of Patent: Feb. 22, 2000

[54] REPRODUCING APPARATUS FOR REPRODUCING MOTION PICTURE FILM

[75] Inventors: Kiyoshi Inatome; Yoshiyuki Suzuki, both of Kanagawa, Japan

[73] Assignee: Sony Cinema Products Corporation, Culver City, Calif.

[21] Appl. No.: 09/027,370

[22] Filed: Feb. 20, 1998

Related U.S. Application Data

[63] Continuation of application No. PCT/JP97/02140, Jun. 20, 1997.

Foreign Application Priority Data

Jun. 24, 1996 [JP] Japan ................................ 8-163027

[51] Int. Cl.⁷ ..................................................... G03B 31/00
[52] U.S. Cl. .................................................. 352/5; 352/26
[58] Field of Search ................................. 352/1, 5, 8, 11, 352/26, 27, 37; 360/3, 32, 48, 53; 369/14

[56] References Cited

U.S. PATENT DOCUMENTS 5,508,761  4/1996  Saito et al. ................................. 352/26
5,757,465  5/1998  Seagrave et al. ........................... 352/11

FOREIGN PATENT DOCUMENTS 7-281324  10/1995  Japan .

*Primary Examiner*—Russell Adams
*Attorney, Agent, or Firm*—Frommer Lawrence & Haug, LLP.; William S. Frommer

[57] ABSTRACT

A motion picture film reproducing device for reading out a tracking pattern recorded on the motion picture film and reading out audio data, after tracking control, for reproducing RF signals. The signal level of a tracking pattern portion of RF signals outputted by a voltage-controlled variable gain amplifier (VCA) 11 adapted fro adjusting the RF signal level is sample-held by a first sample-and-hold (S/H) circuit 13. The average signal level of the audio data portion of the RF signals is sample-held by a second sample-and-hold (S/H) circuit 16 via a low-pass filter made up of a resister 14 and a capacitor 15. A difference detection circuit 18, supplied via a changeover switch 17 with the sample-held output of the first sample-and-hold circuit 13 or the second S/H circuit 16, detects the difference between the signal level of the sample-held output and a pre-set signal level for controlling the VCA for decreasing the detected difference.

5 Claims, 7 Drawing Sheets

REPRODUCING APPARATUS FOR REPRODUCING MOTION PICTURE FILM

This is a continuation of copending International Application PCT/JP97/02140 having an international filing date of Jun. 20, 1997.

TECHNICAL FIELD

This invention relates to a reproducing device for a motion picture film for adjusting the level of reproduced RF signals.

BACKGROUND ART

In a reproducing device for a motion picture film, a CCD (charge-coupled device) line sensor reads out a tracking pattern recorded on the motion picture film for carrying out tracking and reads out a dot pattern of audio data to produce a time varying signal (also referred to herein interchangeably as an "RF signal" or signals). The RF signals are sliced by a comparator at a certain level and the resulting waveform is converted into digital data with the slicing level as reference. Since the slicing level is crucial in converting an analog signal to a digital signal, it needs to be set at a correct and proper position. Therefore, a reproducing device for a motion picture film sets the reference level for the RF signals at a proper value for adjusting the RF signal level for setting the slicing level at an optimum level.

In certain AGC circuits, the amplitude of a Rf data portion is adjusted to a prescribed value, and the slicing level is set to an optimum level with a film on which a dot pattern of a prescribed concentration level is recorded, for example, a level of crossing with an eye pattern of an audio data part.

However, in actual motion picture films, the level of an eye pattern crossing differs with variations in the concentration of a dot pattern recorded on a negative or positive film, even if the RF data portion is of the same amplitude. Therefore, it is difficult with this AGC circuit to set the slicing level at an optimum position.

In other AGC circuits, the average level of the audio data part of the Rf signals is set as the prescribed level. This AGC circuit is superior to the above-mentioned AGC circuit since the crossing level of the average level of the audio data part of the RF signals and the eye pattern varies similarly to changes in the film concentration.

However, if the proportions of the high level portion or the low level portion of the audio data part are offset to one side, the average level of the RF signals is changed under such effect, thus again leading to unstable slice level setting.

In still other AGC circuits, the level of the tracking pattern portion of the RF signals during correct tracking is set as a prescribed level. In these AGC circuits, the level of the tracking pattern portion in the RF signals and the eye pattern crossing point are substantially the same and are varied similarly to the changes in the film concentration. Thus, if the level of the tracking pattern portion is controlled to be a prescribed level, the RF signals can be sliced extremely stably.

However, the pattern recorded on a film is varied in its position along the film width. This variation is produced due to variations in the film running position along its width during pattern recording or to position deviation of the negative or positive film during printing.

Also, during reproductions, the film running position is fluctuated along its width on the running system, so that the reproducing timing of the RF signals fluctuates on a CCD output. Since the audio data portion has a wide pattern width, data sample pulses generated from the CCD start timing are not deviated in the pulse positions from the data area.

However, since the tracking pattern portion is of a narrow width as compared to the amount of change in the signal position, no sampling pulse can be produced from the fixed timing. Thus, the sampling pulses need to be generated from no other than the timing of the playback RF signals.

However, since the level of the tracking pattern portion is detected in a shorter time, it becomes necessary to detect the sampling pulses from a leading position of data from the RF signals for detecting the level for producing the sample pulses.

Moreover, if the RF signal level is deviated significantly from the prescribed value under prevailing conditions of the motion picture film or the light source, the data leading position cannot be detected correctly, such that proper sampling pulses cannot be produced and hence the AGC cannot be operated. In view of the above-described status of the art, it is an object of the present invention to provide a motion picture film reproducing apparatus whereby the prescribed level can be set to an optimum level for the RF signals and the RF signal gain can be controlled for proper digital conversion of RF signals.

DISCLOSURE OF THE INVENTION

The present invention provides a reproducing apparatus for a motion picture film for reading out a tracking pattern recorded on the motion picture film and reading out audio data, after tracking control, for reproducing RF signals. The reproducing apparatus includes level adjustment means for adjusting the level of the RF signals, first sample-and-hold means for sample-holding the level of a tracking pattern portion of the RF signals, second sample-and-hold means for sample-holding the level of an average level of an audio data portion of the RF signals, output switching means for outputting the level of the RF signals sample-held by the first sample-and-hold means or the second sample-and-hold means, control means for controlling output switching of the output switching means so that, if the level adjustment means detects a pre-set waveform of the RF signals, the output switching means outputs RF signals from the first sample-and-hold means and, if the level adjustment means fails to detect a pre-set waveform of the RF signals, the output switching means outputs RF signals from the second sample-and-hold means and difference detection means for detecting a difference between the level of the RF signal level outputted from the output switching means and a reference level for controlling the level adjustment means for reducing the difference to zero.

With the present motion picture film reproducing device according to the present invention, the RF signal gain is controlled so that, before detecting the pre-set waveform of the RF signals, the level of an average value of the RF signals will be a pre-set level and, after detecting the pre-set waveform of the RF signals, the level of the tracking pattern portion of the RF signals will be a pre-set level.

BEST MODE FOR CARRYING OUT THE INVENTION

Figure 1:
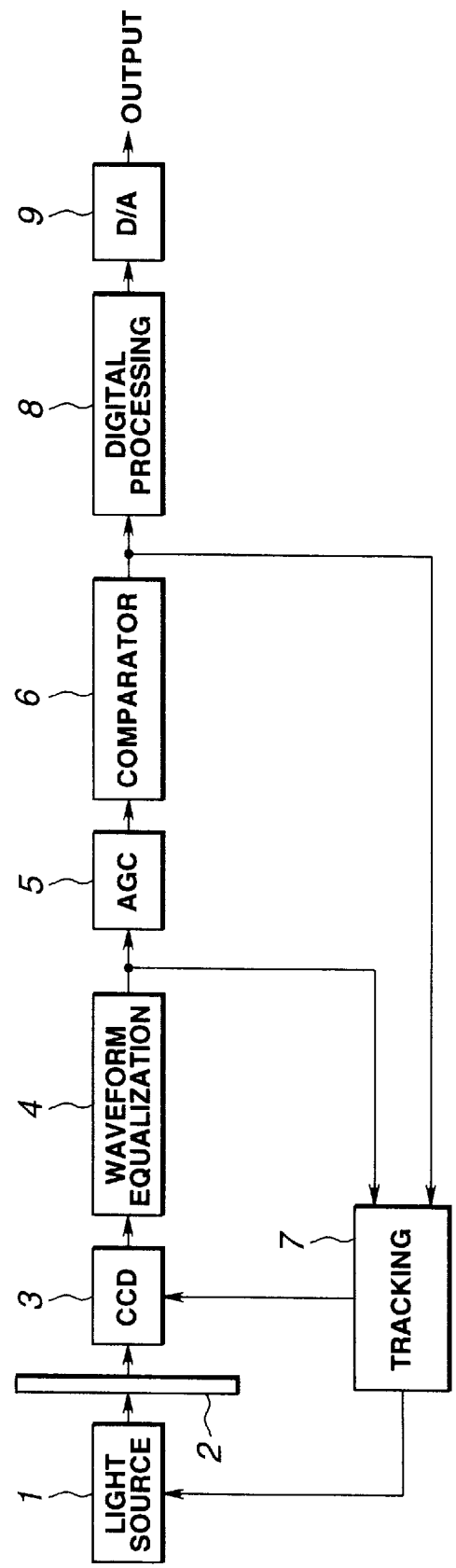
FIG. 1 is a schematic block diagram showing the structure of a motion picture film reproducing device according to the present invention.

Referring to the drawings, preferred embodiments for carrying out the present invention will be explained in detail.

The present invention is applied to a motion picture film reproducing device shown for example in FIG. 1.

The reproducing device for the motion picture film includes a CCD (charge-coupled device) line sensor 3, for reading out audio data of a motion picture film 2 illuminated by a light source 1, and an automatic gain control (AGC) circuit 5 for adjusting the RF signal from the CCD line sensor 3, having the noise content reduced by a waveform equalization circuit 4, to a prescribed value. The reproducing device also includes a tracking circuit 7 for tracking-controlling the light source 1 and the CCD line sensor 3 and a digital processing circuit 8 for performing digital processing based on the RF data.

Specifically, the light source 1 illuminates light on the digital sound track, having recorded thereon audio data or the like, from the back side of the motion picture film 2, by, for example, a light emitting diode (LED).

Figure 2:
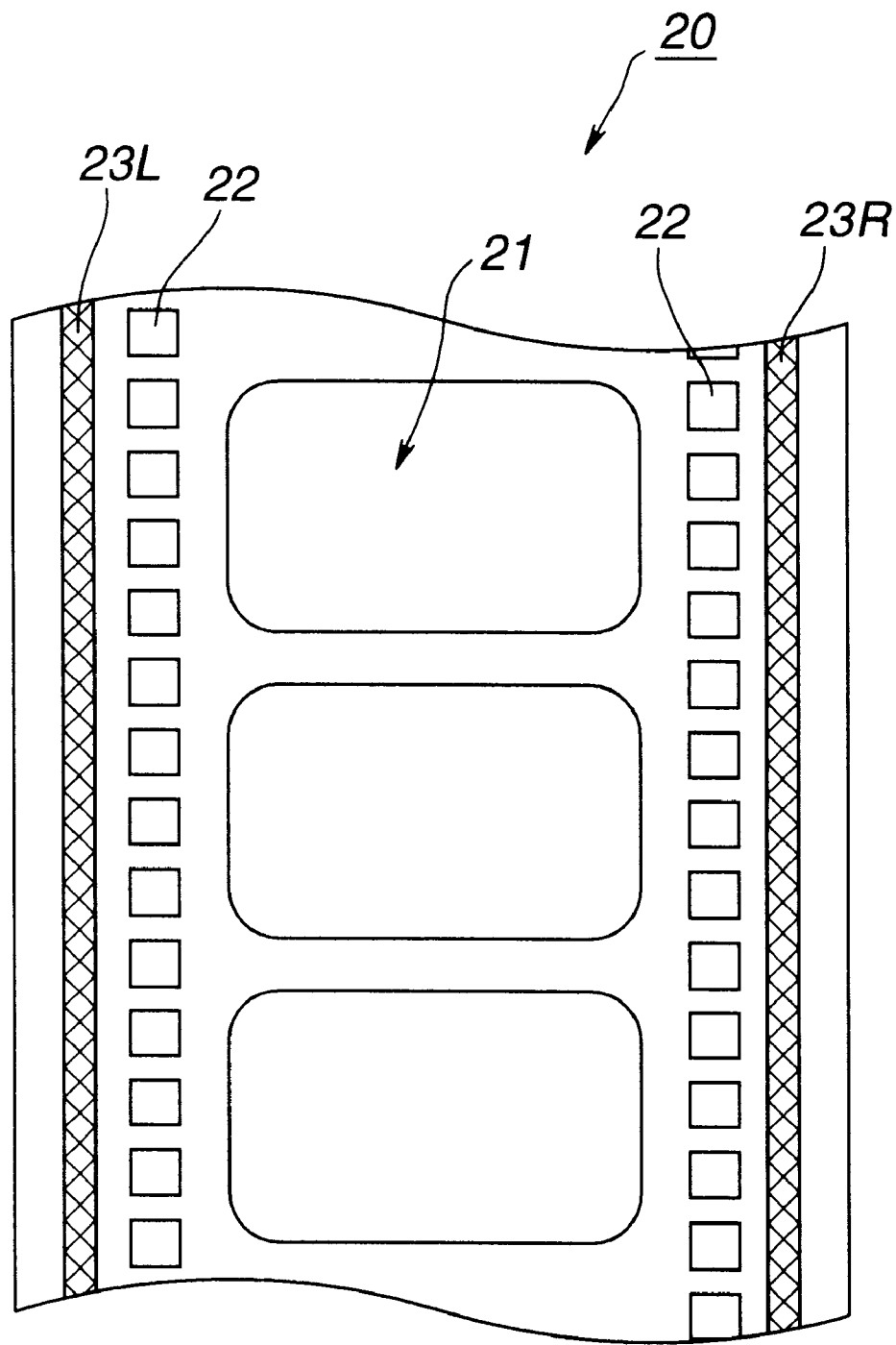
FIG. 2 is a plan view of a motion picture film having recorded thereon audio data to be reproduced by the motion picture film reproducing device shown in FIG. 1.

The motion picture film 2 includes an image recording area 21, for recording an image for projection, perforations 22 provided for film take-up on both sides of the image recording area 21 for taking up the motion picture film 2, and digital sound tracks 23L, 23R formed for extending linearly along the film advancing direction between the perforations 22 and both film edges, as shown in FIG. 2.

Figure 3:
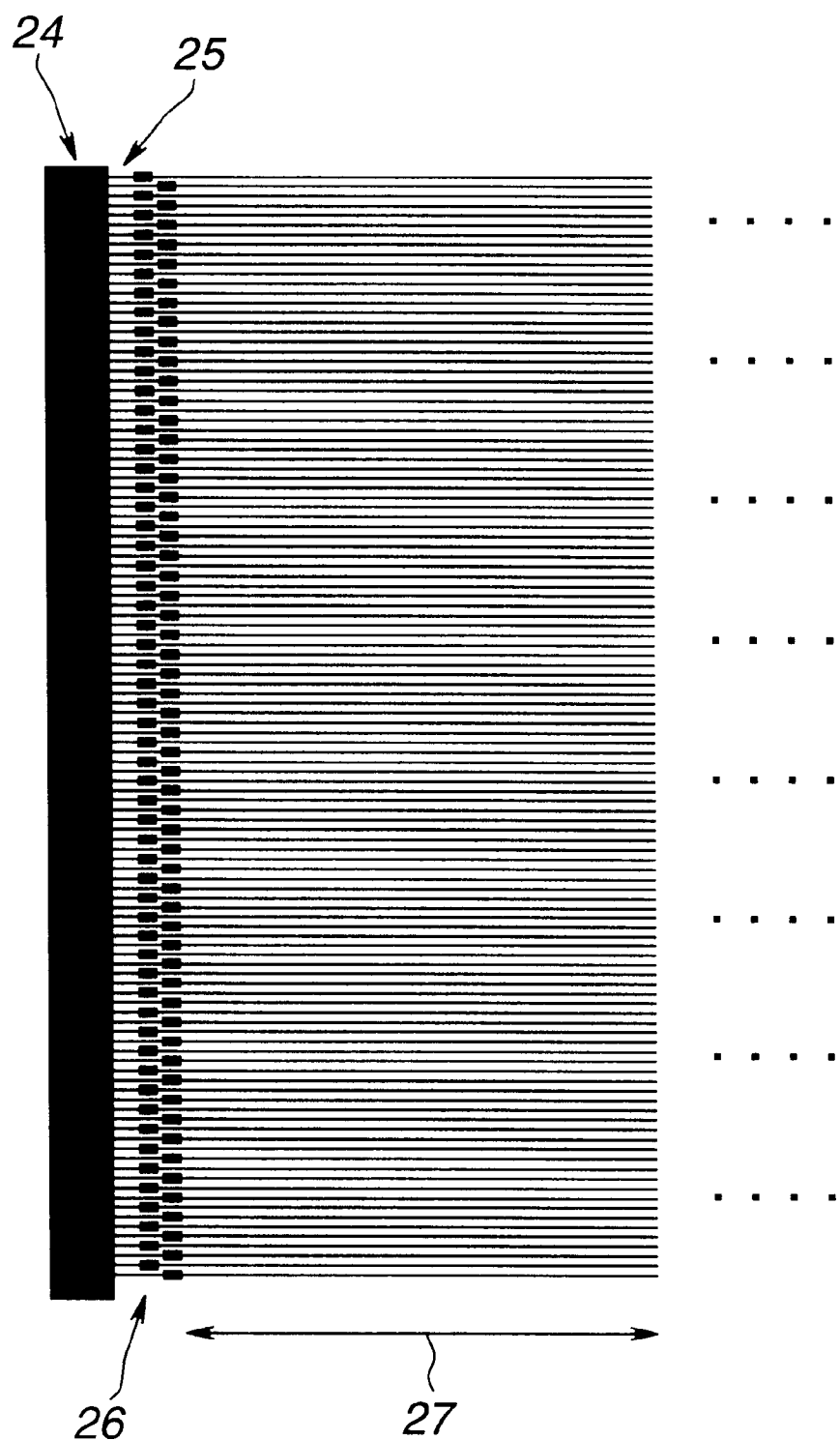
FIG. 3 is a plan view showing essential parts of a digital sound track provided on the motion picture film.

The digital sound track 23L includes, as shown in FIG. 3, a black line 24, an unrecorded line 25, a tracking pattern 26 and an audio data dot pattern (data pattern) 27. The black line 24 is a black pattern of, for example, five dots, formed for extending along the sound track in the film width direction (transverse direction). The unrecorded line 25 is an unrecorded portion of, for example, two dots, arrayed along the black line 24 in the transverse direction, while the tracking pattern 26 is a pattern of alternate white and black with a phase shift of one-half dot in the film travel direction (longitudinal direction) relative to the data pattern as later explained.

The digital sound track 23R includes the black line 24, unrecorded portion 25, tracking pattern 26 and the data pattern 27, in left/right symmetry with respect to the digital sound track 23L.

The CCD line sensor 3 is configured for reading out the tracking pattern 26 and the data pattern 27 recorded on the motion picture film 2, by light illumination from the light source 1, beginning from the film edge side in the transverse direction from one transverse row to another. The CCD line sensor 3 converts the brightness and darkness of the tracking pattern 26 and the data pattern 27 into signal charges which are serially outputted in the form of a time varying voltage (referred to herein as "RF signals").

Figure 4:
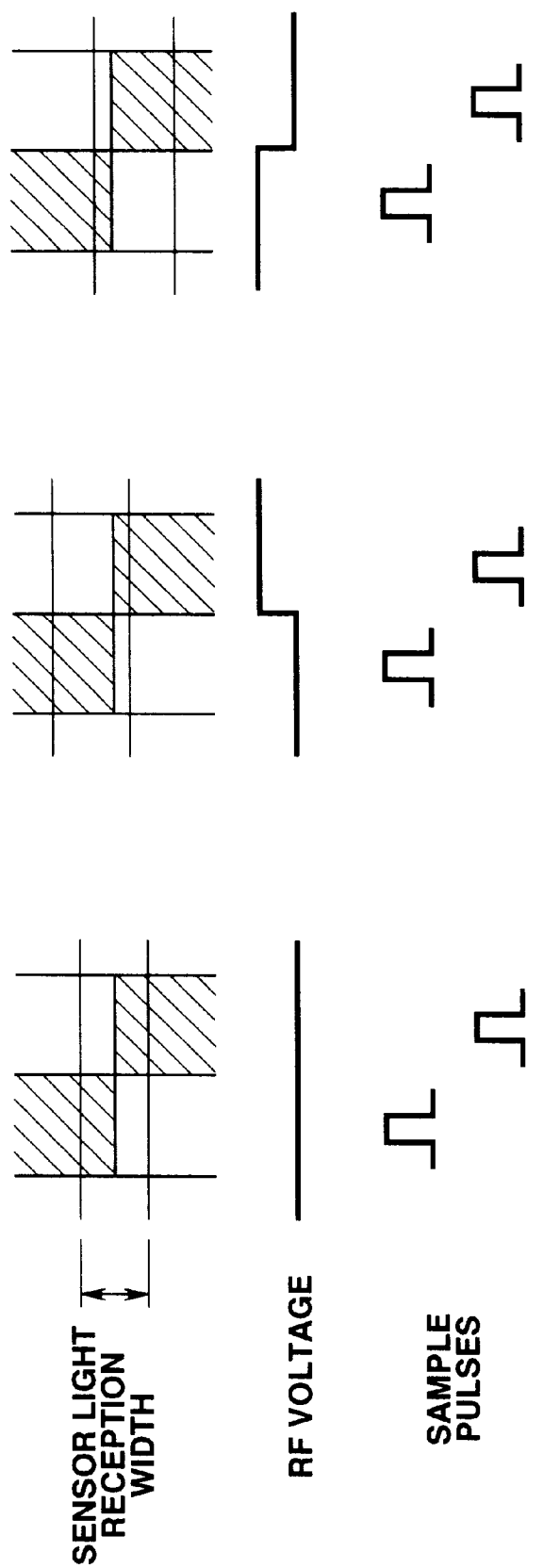
FIG. 4 illustrates an outputting state of a CCD line sensor during tracking control by the motion picture film reproducing device shown in FIG. 1.

In the CCD line sensor 3, the output level on left and right sides of two longitudinal tracking patterns is varied depending on the state of tracking, as shown in FIG. 4. For example, if the CCD line sensor 3 is correctly tracking the data pattern (on-track), there is no difference between the left and right output levels obtained by the sampling pulses. However, if the CCD line sensor 3 is deviated from the on-track position, the right side output level or the left side output level, obtained by the sampling pulses, becomes larger. Thus, if tracking is done for reducing the difference between the left and right output levels to zero, the CCD line sensor 3 can correctly read the data pattern 27.

Meanwhile, since the CCD line sensor 3 is required to read the transverse data pattern 27 correctly whilst the film is run in the longitudinal direction, it needs to receive light intermittently. Thus, the light source 1 is lit in a pulsed pattern, or an electronic shutter is provided in the CCD line sensor 3. Alternatively, a liquid crystal shutter is provided between the motion picture film 2 and the CCD line sensor 3.

The waveform equalization circuit 4 reduces the random noise contained in the RF signals supplied from the CCD line sensor 3 and sends the resulting RF signals to the AGC circuit 5 and to the tracking circuit 7.

Figure 5:
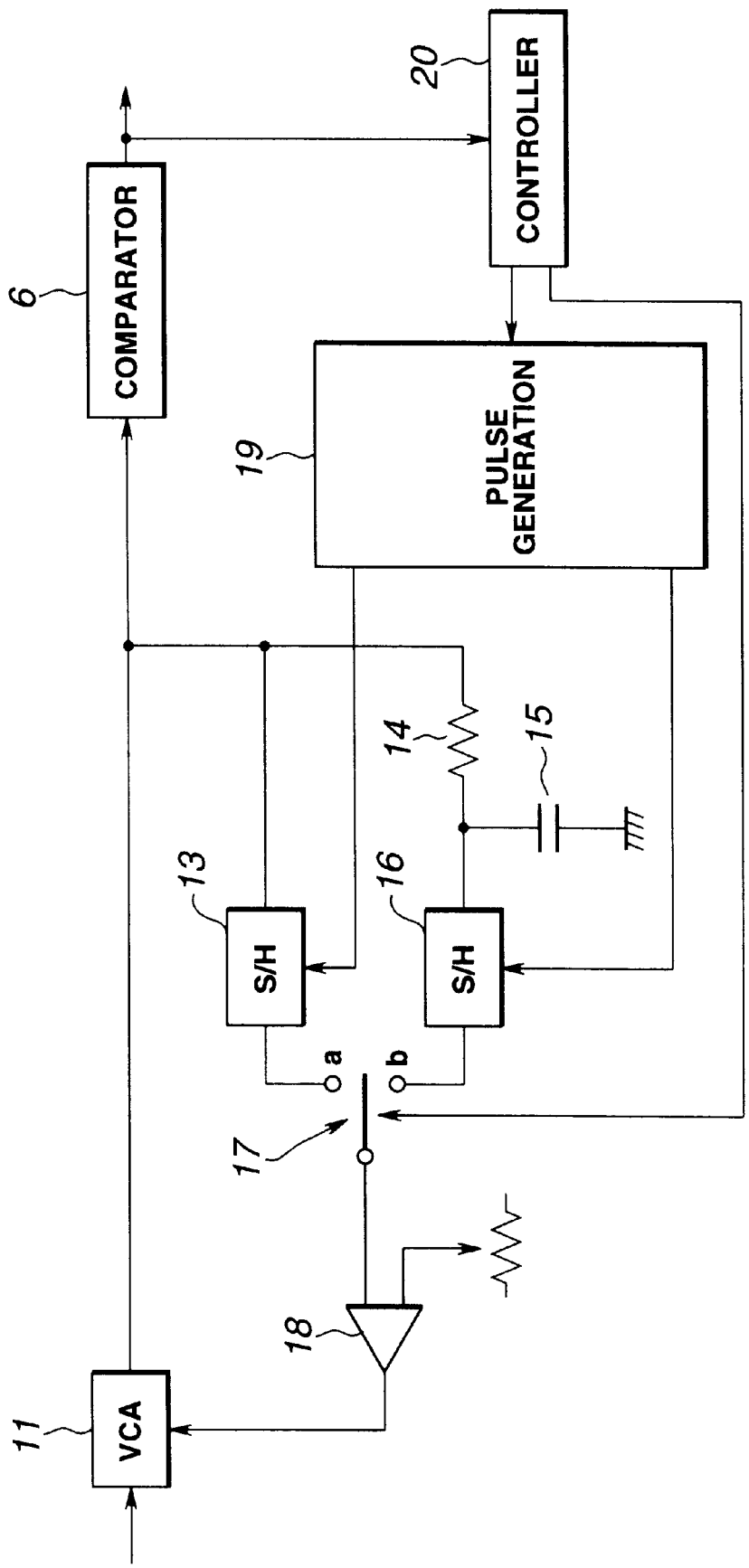
FIG. 5 is a block diagram showing a detailed structure of an AGC circuit of the motion picture film reproducing device shown in FIG. 1.

Referring to FIG. 5, the AGC circuit 5 includes a voltage-controlled type variable gain amplifier (VCA) for controlling the signal level of the supplied RF signals, and a sample-and-hold circuit (S/H circuit) for sample-holding RF signals from the VCA 11. The AGC circuit 5 also includes a S/H circuit 16 for sample-holding the RF signals from the VCA 11 via a low-pass filter made up of a resistor 14 and a capacitor 15, and a changeover switch 17 for outputting audio data from the S/H circuit 13 or the S/H circuit 16. The AGC circuit 5 also includes a difference detection circuit 18 for detecting the difference between the signal level from the changeover switch 17 and a pre-set signal level for controlling the VCA 11 for decreasing the difference.

The AGC circuit 5 further includes a pulse generating circuit 19 for generating pulses to be supplied to the S/H circuits 13 or 16 and a controller 20 for switching-controlling the changeover switch 17 based on audio data from the comparator 6 and for controlling the pulses generated by the pulse generating circuit 19. The comparator 6, which will be explained substantially, is fed with the RF signals from the VCA 11.

The comparator 6 slices the RF signals supplied from the AGC circuit 5 and converts the RF signals into digital signals with this slicing level as reference. That is, the comparator 6 causes the slicing level to coincide with the reference level of the AGC circuit 5 for converting the RF signals into digital signals, with the slicing level as reference. The comparator 6 sends the RF data converted into digital signals to the tracking circuit and to the digital processing circuit 8.

The tracking circuit 7 tracking-controls the light source 1 and the CCD line sensor 3, based on the RF signals supplied from the waveform equalization circuit 4 and the comparator 6. Specifically, the tracking circuit 7 tracking-controls the CCD line sensor 3 so that the output levels on the left and right sides of the tracking pattern of the RF signals outputted by the CCD line sensor 3 will be equal to each other. This allows the CCD line sensor 3 to perform tracking at the on-track position.

The digital processing circuit 8 digitizes the supplied RF data to output the digitized data as speech signal via D/A converter 9.

Figure 6:
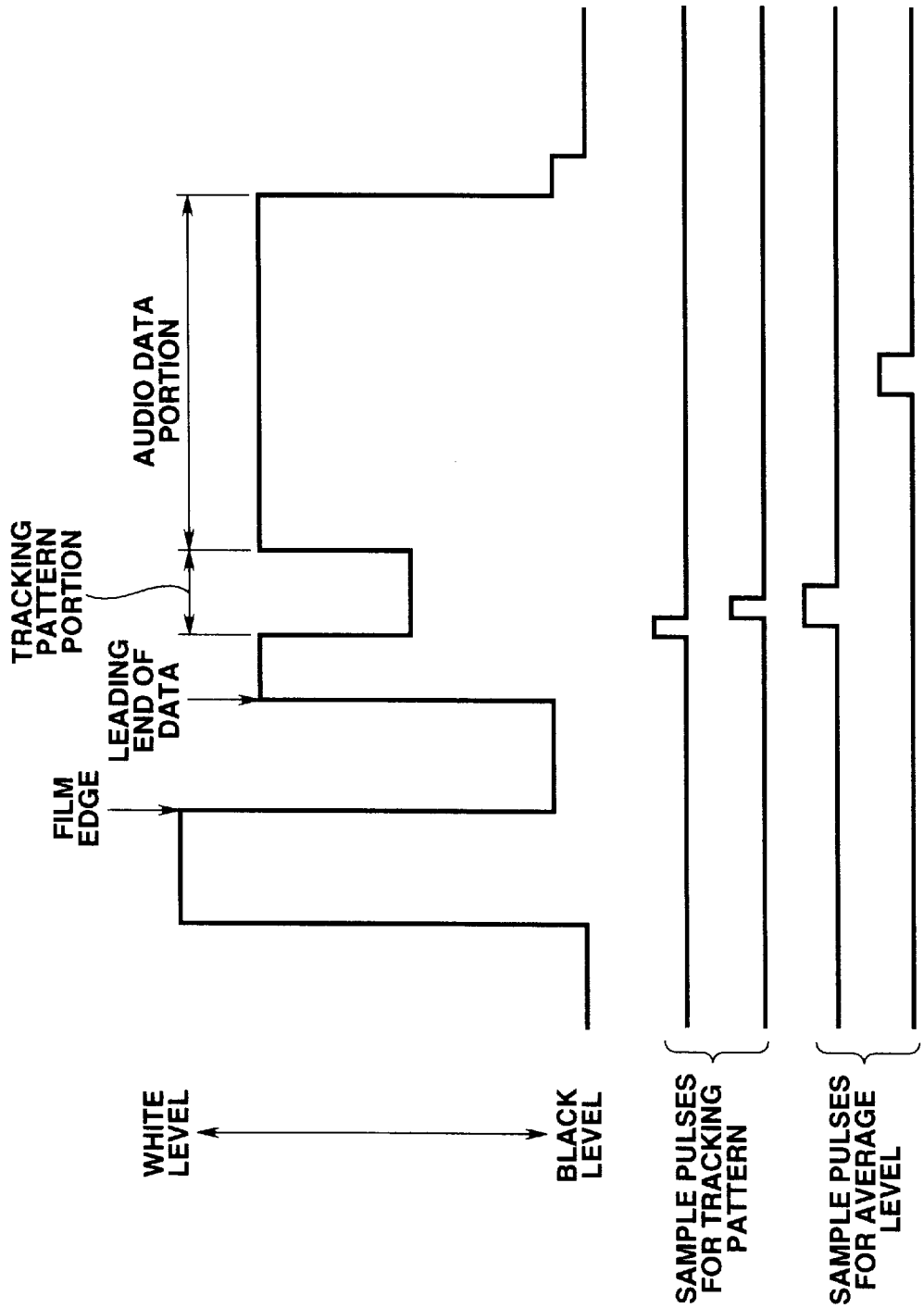
FIG. 6 illustrates the level of the RF signals outputted by the CCD line sensor.

On starting reading out the tracking pattern or the data pattern, the CCD line sensor 3 of the motion picture film reproducing device outputs the black level of the 5 dots in the transverse direction of the black line 24, the white level of the 2 dots of the unrecorded portion 25, the level difference between the black and white levels by the tracking pattern 26 and the audio data level, as shown for example in FIG. 6. The RF signals are sent via waveform equalization circuit 4 to the AGC circuit 5.

Figure 7:
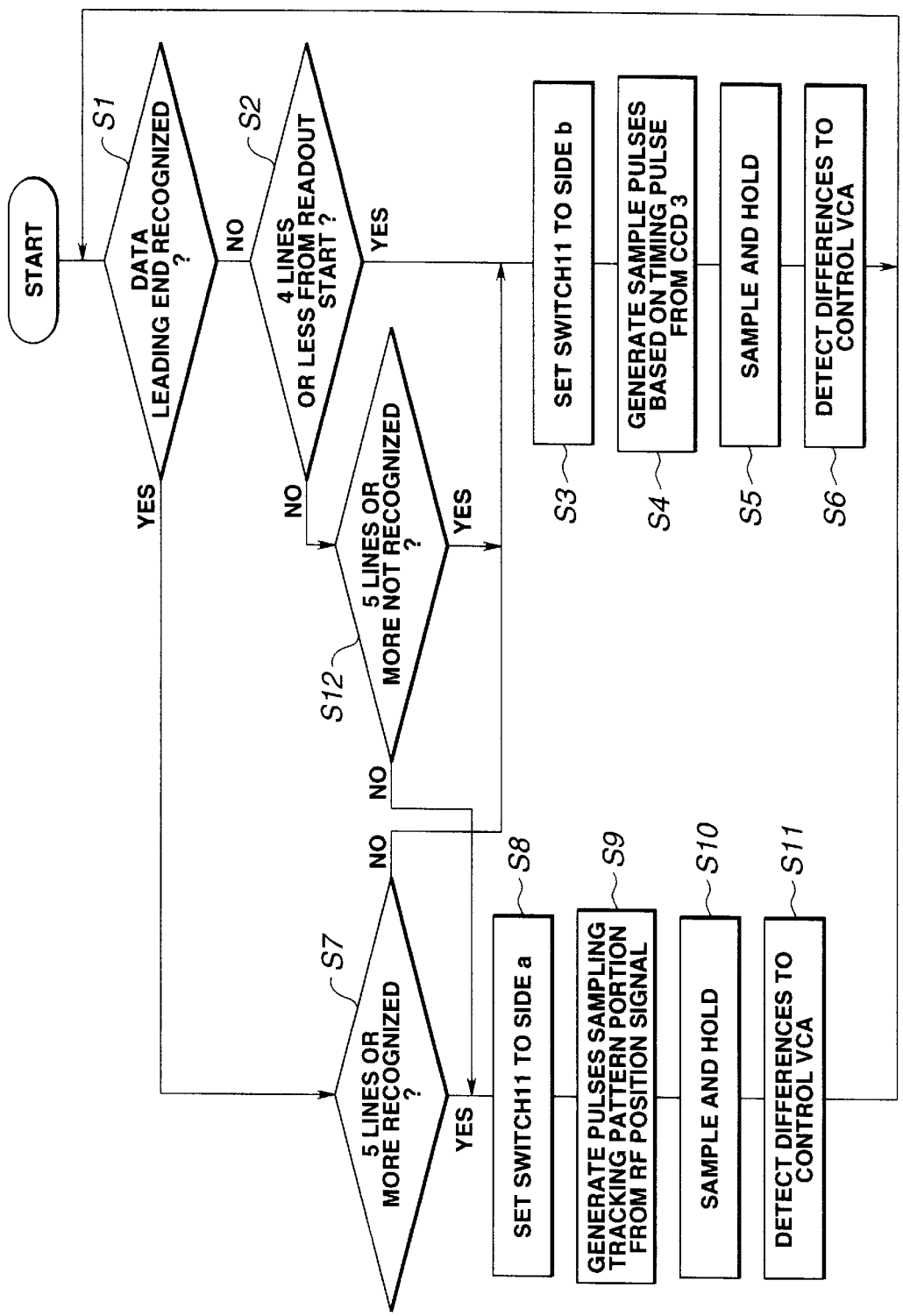
FIG. 7 is a flowchart for illustrating the operation of the AGC circuit shown in FIG. 5.

When supplied with the audio data to the controller 20, the AGC circuit 5 adjusts the RF signal level as follows:

That is, at step S1 in FIG. 7, the controller 20 judges, from the RF data supplied from the comparator 6, whether or not the 5 dots, for example, of the black level have been detected after detecting the white level and subsequently the black level has again been detected, that is whether or not the data leading position has been detected. If the data leading position has been detected, processing transfers to step S7 and, if otherwise, to step S2.

At step S2, the controller 20 judges whether or not readout of a data pattern by the CCD line sensor 3 is within 4 lines as from the start of reproduction. If the result is affirmative, that is if the readout directly follows the reproduction, processing transfers to step S3. If the result is negative, that is if proper tracking becomes impossible during reproduction, processing transfers to step S12. That is, the controller 20 judges whether the cessation of proper tracking by the CCD line sensor 3 has occurred directly after start of reproduction or has occurred during reproduction due to changes in concentration in dot pattern in the motion picture film. Based on the result of judgment, the controller proceeds to processing at step S3 or S12.

At step S3, the controller 20 sets the changeover switch 17 to the side of a terminal b before processing transfers to step S4.

At step S4, the S/H circuit 16 sample-holds an average value of the RF signal level from the VCA 11, via low-pass filter made up of the resistor 14 and the capacitor 15, responsive to sampling pulses from the pulse generating circuit 19.

Simultaneously with start of reproduction, the pulse generating circuit 19 generates sampling pulses, based on the timing pulse supplied from the CCD line sensor 3, for sample-holding average value levels of the audio data portion of RF signals.

The S/H circuit 16 routes the value of the sample-held signal level values via changeover switch 17 to the detecting circuit 18 before proceeding to step S6.

At step S6, the difference detection circuit 18 detects the difference between the level of the RF signal supplied from the changeover switch 17 and the reference level to control the VCA 1 for adjusting the RF signal level for reducing the difference to zero.

At step S7, to which the controller 20 proceeds based on its judgment that the data leading position has been detected, the controller 20 judges whether or not the data leading position has been detected for, for example, more than 5 lines on end. If the result is affirmative, that is if tracking is being carried out in stability, the controller proceeds to step S8. If the data leading position has not been detected for, for example, more than 5 lines on end, that is if tracking is not being carried out in stability, the controller proceeds to the above step S3. Stated differently, if the CCD line sensor 3 is in a stable on-track state, the AGC circuit 5 performs processing of step S8 for setting the average level of the tracking pattern portion of the RF signal to the reference level. If the CCD line sensor 3 is not in the on-track state, the AGC circuit 5 performs the processing of the above step S3.

At step S8, the controller 20 sets the changeover switch 17 to a terminal a before proceeding to step S9.

At step S9, the controller 20 generates sampling pulses to sample RF signals of the tracking pattern by the pulse generating circuit 19 before proceeding to step S10. That is, if data readout by the CCD line sensor directly follows the start of reproduction, the pulse generating circuit 19 generates sampling pulses based on the timing pulses from the CCD line sensor 3. If the CCD line sensor 3 is on-track state, the pulse generating circuit 19 generates sampling pulses for sample-holding the level of the tracking pattern portion of the RF signals based on control by the controller 20.

At step S10, the S/H circuit 13 sample-holds the average level of the tracking pattern portion from the VCA 11. The S/H circuit 13 sends the sample-held value of the signal level via changeover switch 17 to the difference detection circuit 18 before proceeding to step S11.

At step S11, the difference detection circuit 18 detects the difference between the RF signal level supplied from the changeover switch 17 and the reference level and controls the VCA 11 for adjusting the RF signal level so that the difference will be reduced to zero. That is, if the data leading position is detected, the AGC circuit 5 sets the level of the tracking pattern portion of the RF signal to the prescribed value for adjusting the RF signal level.

At step S12, to which processing transfers based on the result of judgment that less than 4 lines have been read out as from the start of reproduction by the CCD line sensor 3, the controller 20 judges whether or not the data leading position has not been detected more than five lines on end. If the data leading position has not been detected more than five lines on end, that is if the CCD line sensor 3 is off the on-track state only for a moment, the controller 20 proceeds to step S8 to carry out the subsequent operations. If this does not hold, that is if tracking has become totally impossible during reproduction, the controller proceeds to step S3 to carry out the subsequent operations.

With the above-described motion picture film reproducing device according to the present invention, the gain of the RF signal is controlled, before detecting the data leading position, so that the average level of the audio data portion of the RF signal will be of a prescribed value. After detection of the data leading position, the RF signal gain can be controlled so that the tracking pattern portion of the RF signal will be at a level of the prescribed value.

Thus, with the above-described motion picture film reproducing device, even if the RF signal level has been changed such that the data leading position has become unable to be detected due to fluctuations in concentration of dot patterns in the motion picture film or changes in light volume of the read-out light source, the RF signal gain can be adjusted to an optimum value by setting the average value of the level of the audio data portion of the RF signals to the reference level.

Also, with the above-described motion picture film reproducing device, the data leading position can be detected despite fluctuations in the dot pattern concentration of the motion picture film, thus enabling correct and stable tracking of the CCD line sensor 3. The result is that, with the present motion picture film reproducing device, the RF signal level can be adjusted with high accuracy by setting the level of the tracking pattern portion of the RF signal to the prescribed level.

With the present motion picture film reproducing device, since the optimum RF signals can be obtained even if the dot pattern concentration of the motion picture film 2 undergoes fluctuations to a more or less extent, proper RF signals can be produced, thus facilitating manufacture of a motion picture film. Since the tolerance in light volume changes of the dot pattern readout light source can be enlarged, manufacture of the motion picture film reproducing device itself is also facilitated.

The result is that the motion picture film reproducing device suffers less from errors in reading out the dot pattern recorded on the motion picture film, thus assuring the high-quality reproduced sound.

We claim:

1. A reproducing apparatus for a motion picture film having a tracking pattern and an audio data pattern recorded thereon, said apparatus including a device for providing a time varying signal having a tracking pattern portion and an audio data portion by scanning said tracking pattern and audio data comprising:

level adjustment means for adjusting the level of the time varying signal first sample-and-hold means for sample-holding the level of the tracking pattern portion of the time varying signal;

second sample-and-hold means for sample-holding the level of the audio data portion of the time varying signal so as to provide an average signal level associated with the audio data portion;

output switching means for outputting the level of the time varying signal sample-held by said first sample-and-hold means or said second sample-and-hold means;

control means for controlling output switching of said output switching means so that, if a pre-set waveform of said time varying signal is detected, said output switching means outputs a level from said first sample-and-hold means and, if said pre-set waveform is not detected, said output switching means outputs a level from said second sample-and-hold means; and difference detection means for detecting a difference between the level outputted from said output switching means and a reference level for controlling said level adjustment means to reduce the difference.

2. The reproducing apparatus for a motion picture film as claimed in claim 1 wherein said control means controls output switching of said output switching means so that, if said pre-set waveform is detected a pre-set number of times on end, said output switching means outputs the level from said first sample-and-hold means and, if said pre-set waveform is not detected a pre-set number of times on end, said output switching means outputs the level from said second sample-and-hold means.

3. The reproducing apparatus as claimed in claim 1 wherein said device for providing a time varying signal is a charge-coupled device.

4. In a reproducing apparatus for a motion picture film having a tracking pattern and an audio data pattern recorded thereon, said apparatus including a device for providing a time varying signal having a tracking pattern portion and an audio data portion by scanning said tracking pattern and audio data pattern, and an amplifier for adjusting the level of the time varying signal responsive to a control signal, a method for optimizing gain of the amplifier to reduce the occurrence of data read errors, comprising the steps of:

detecting an average level of the tracking pattern portion of the time varying signal;

detecting an average level of the audio data portion of the time varying signal;

controlling the gain of said amplifier such that, under a predetermined condition, the detected average level of said tracking pattern portion is set about equal to a reference level, and absent said predetermined condition, the detected average level of said audio data portion is set about equal to said reference level.

5. The method of claim 4, wherein said predetermined condition is the recognition of a prescribed number of data lines.

* * * * *